(12) United States Patent
Myers

(10) Patent No.: US 6,784,839 B2
(45) Date of Patent: Aug. 31, 2004

(54) STEERABLE ANTENNA INTERFERER REJECTION TECHNIQUES

(75) Inventor: Michael H. Myers, Poway, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/278,522

(22) Filed: Oct. 23, 2002

(65) Prior Publication Data
US 2004/0080453 A1 Apr. 29, 2004

(51) Int. Cl.[7] .............. G01S 3/16; G01S 3/28
(52) U.S. Cl. .............. 342/378; 342/380; 342/383
(58) Field of Search .............. 342/378, 380, 342/383

(56) References Cited

U.S. PATENT DOCUMENTS 4,286,868 A 9/1981 Laska 6,115,409 A * 9/2000 Upadhyay et al. .......... 375/144

* cited by examiner

Primary Examiner—Theodore M. Blum
(74) Attorney, Agent, or Firm—Tarolli, Sundheim, Covell & Tummino L.L.P.

(57) ABSTRACT

A steerable antenna array (10) includes a plurality of antenna elements (12a–12f) which receive broad band signals and narrow band interfering signals which together form antenna signals. The antenna signals are combined with weighting signals by combining functions (16a–16f) to form a combined signal, which is filtered by a filter function (30) to filter the narrow band signals. The filtered signals are sent to a weight processor (50) which also receives the antenna signals as an input. The processor (50) generates the weighting signals so that interference from the narrow band signals is reduced.

19 Claims, 3 Drawing Sheets

Adaptive Antenna With Interferer Selective Nulling

STEERABLE ANTENNA INTERFERER REJECTION TECHNIQUES

BACKGROUND OF THE INVENTION

This invention relates to steerable antennas, and more specifically relates to the rejection of interfering signals in such antennas.

In communications systems, there is a need to protect some critical receive functions (such as GPS) against one or more external interfering sources by employing the use of steerable null antennas having multiple antenna elements. Because space on aircraft, (especially on military fighters) is very limited, the number of antenna elements must be kept to an absolute minimum. The number of interferers that can be nulled by such a multi-element antenna is limited by the number of it's steerable elements. Since multiple interferers can exist, it is possible that the number of interferers can exceed the antenna element count, and thus compromise the ability of the antenna to cancel. This invention addresses this problem and provides a solution.

BRIEF SUMMARY OF THE INVENTION

The invention is useful in a steerable antenna comprising a plurality of antenna elements receiving a first type signal and an interfering second type signal different from the first type signal. The antenna elements generate corresponding antenna signals, and the antenna signals are combined with weighting signals to form at least one combined signal. In such an environment the interfering second type signals may be nulled by filtering the second type signal from the combined signal to generate a filtered signal. The filtering preferably is accomplished with a processor. The weighting signals are generated in response to the filtered signal and the antenna signals. The generating of the weighting signals also is preferably accomplished with a processor. As a result, interference from the second type signal is reduced.

DETAILED DESCRIPTION OF THE INVENTION

According to the preferred embodiment, a steerable antenna can be used to null interfering signals of a type different from the signals intended for communication. The applicant has discovered that interferers which differ from the desired waveform (such as GPS) in their spectral shape, the canceling antenna can be made to ignore those interferers by time domain filtering in the antenna steering control loop. This technique permits all the antenna's degrees of freedom to focus on those interferers that cannot be differentiated from the desired signal in the frequency domain.

In general, the preferred embodiment of the invention comprises an N-element steerable antenna array capable of creating nulls in N−1 directions, where the steering information is developed from the gradient with respect to power measured at each element. The gradient can be developed by taking a short term correlation of the combined antenna output with the inputs to each of the elements. An adaptive gradient steered time domain filter is added in the correlator feedback loops in order to try to minimize the effect of differentiable by spectrum interferers on the antenna steering signal. In this way it will automatically develop nulls on those functions whose spectra differ in shape (are differentiable) from the desired signal. Thus when the combined output is filtered by such a filter and the filtered output is used to develop the gradient steering information, the gradient steering information will not see those interferers which were in fact attenuated by the adaptive time domain filter, and thus the antenna steering will only be against those interferers that are seen by the correlators.

Referring to the Figures, the system of the present invention includes an adaptive true steepest descent power inversion nulling antenna array 10 with narrowband jammer energy reduced in the signal used to control the array steering. In the FIGS. 1 and 2, a linear, uniform half wavelength spacing, six element array, is used to generate antenna signals. The antenna signals generated by elements 12a–12f are amplified and filtered in a well known manner by corresponding preamplification and filtering circuits 14a–14f. The amplified and filtered antenna signals are processed by weighting and combining functions 16a–16f (FIG. 3), a feedback path narrowband jammer suppression filter 30, and a weight processor 50 which comprises a correlation gradient array steering control.

Figure 1:
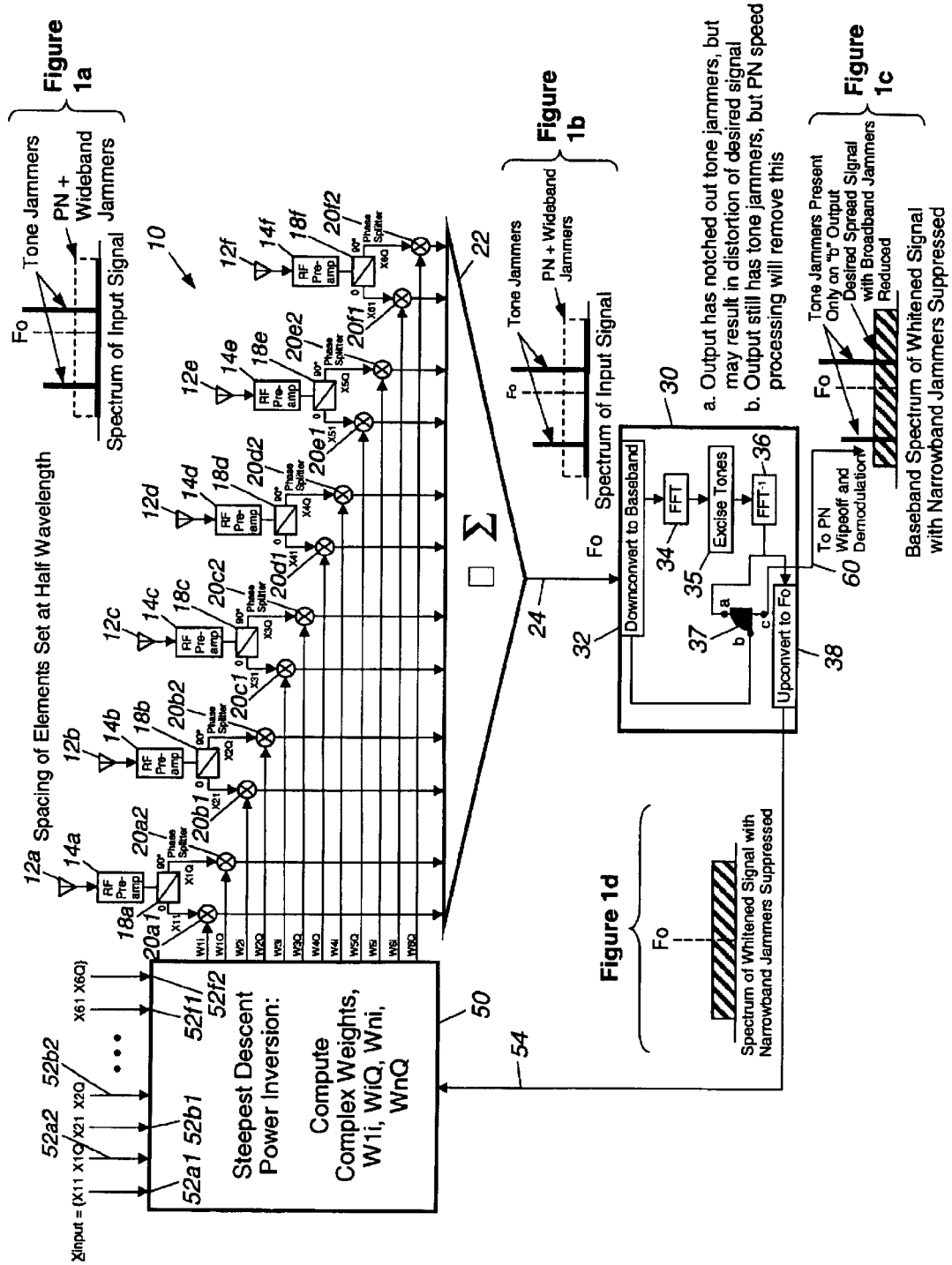
FIGS. 1a–1d is a schematic block diagrams of a preferred embodiment of the invention employing a filter using fast Fourier transforms.
Figure 2:
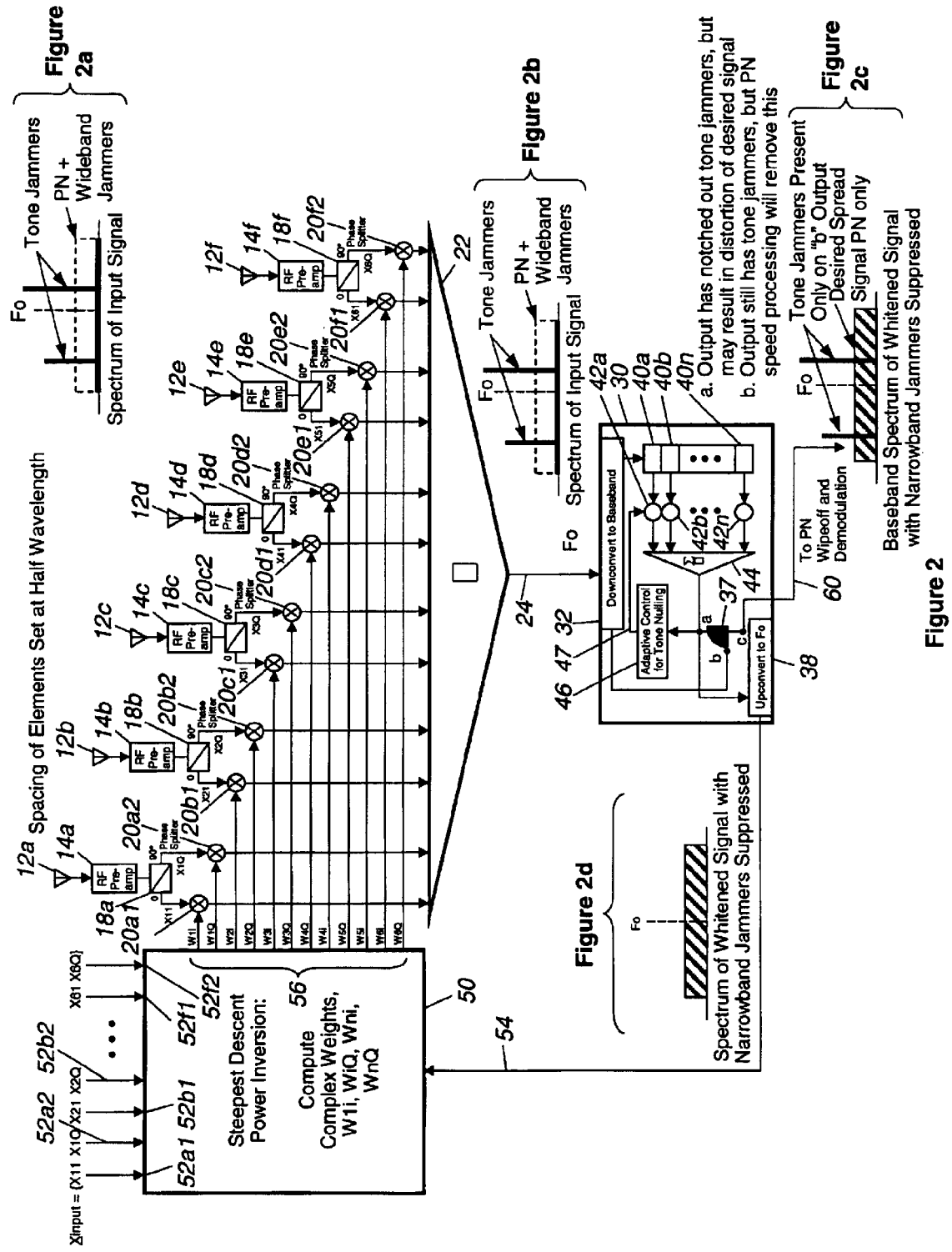
FIGS. 2a–2d is a schematic block diagrams of another embodiment of the invention employing a filter using an adaptive transversal filter.

As shown in FIGS. 1 and 2, circuitry 16a–16f more specifically includes phase splitter functions 18a–18f and multiplier functions 20a1, 20a2, 20b1, 20b2, 20c1, 20c2, 20d1, 20d2, 20e1 and 20e2 which multiply the value of weighting signals W1–W6 times the I and Q components of antenna signals generated by elements 12a–12f. The multiplier circuits perform a typical complex multiplication.

The combined signals generated by functions 16a–16f are summed by a summing function 22 to form a single combined signal on an output 24.

It can be appreciated by one of ordinary skill in the art that if the narrowband jammer suppression filter 30 were removed, what remains would be a true steepest descent power inversion nulling array, described in detail in U.S. No. 4,286,268 which is incorporated by reference in its entirety.

In the embodiments shown, only two weights per antenna element are used, limiting the broadband performance to less than 10% of the center frequency Fo. However, the principles of the embodiment would apply equally to any adaptive steepest descent antenna array, regardless of configuration.

The preferred embodiment uses a narrowband tone suppression circuit 30 in the feedback path from the combined array output 24 to the weight computation block 50. The exact method of implementing this circuit 30 can be chosen by one skilled in the art, and its function is to reduce or remove entirely narrowband energy in a wideband spectrum, where the narrowband energy can be seen to exceed the wideband spectral density, as shown in FIGS. 1A–1D and 2A–2D. For example, filter 30 may comprise a processor which executes algorithms corresponding to the boxes within filter 30 shown in FIGS. 1 and 2. In FIGS. 1 and 2, two examples of filtering are given.

In FIG. 1, the combined signal on output 24 is down converted to base band by a down converter function 32. A fast Fourier transform (FFT) is first performed on the output by an FFT function 34. The resulting frequency domain spectrum is examined for flatness, and any frequency bins, exceeding a constant >1 times the average spectral density level are either reduced to the average level (this is equivalent to whitening the spectrum) or excised entirely by an excise tones or filtering function 35. The resulting frequency domain corrected signal is converted to the time domain by an inverse fast Fourier transform function 36. The time domain corrected signal is up converted to radio frequency range by an up covert function 38.

In FIG. 2, an adaptive transversal filter 30 uses power minimization to effectively seek any spectral tones exceeding the average spectral density of the wideband jammers, and to thus notch them down to or below the average level, which is a form of whitening. By reducing the narrowband jammers, as described below, the narrowband jammers will not produce any cross correlation terms in the weight computation 50 where the energy in the input vector X(t) is correlated with the combined output 54. By thus suppressing narrowband energy here, the nature of steepest descent steering as described in U.S. No. 4,286,268 will cause the array to first null out the strongest broadband jammers, and in fact, nulling will be proportional to the cross correlation energy obtained in 50. In order to achieve the foregoing mode of operation, the FIG. 2 embodiment of filter 30 employs down convert function 32 as described in connection with FIG. 1. The down converted signals are fed to a delay line function employing delay line flip flops 40a and 40b–40n. Each flip flop delays the signal by one sample time. The output of the flip flops is fed to multipliers 42a and 42b–42n. Each of the multipliers also receives an input from an adaptive control for tone nulling function 46. Only one such input is shown in FIG. 2 as path 47. The outputs of the multipliers is sent to a summing function 44 as shown. The summing function generates corrected signals which are up converted by up convert function 38 explained in connection with FIG. 1.

Figure 3:
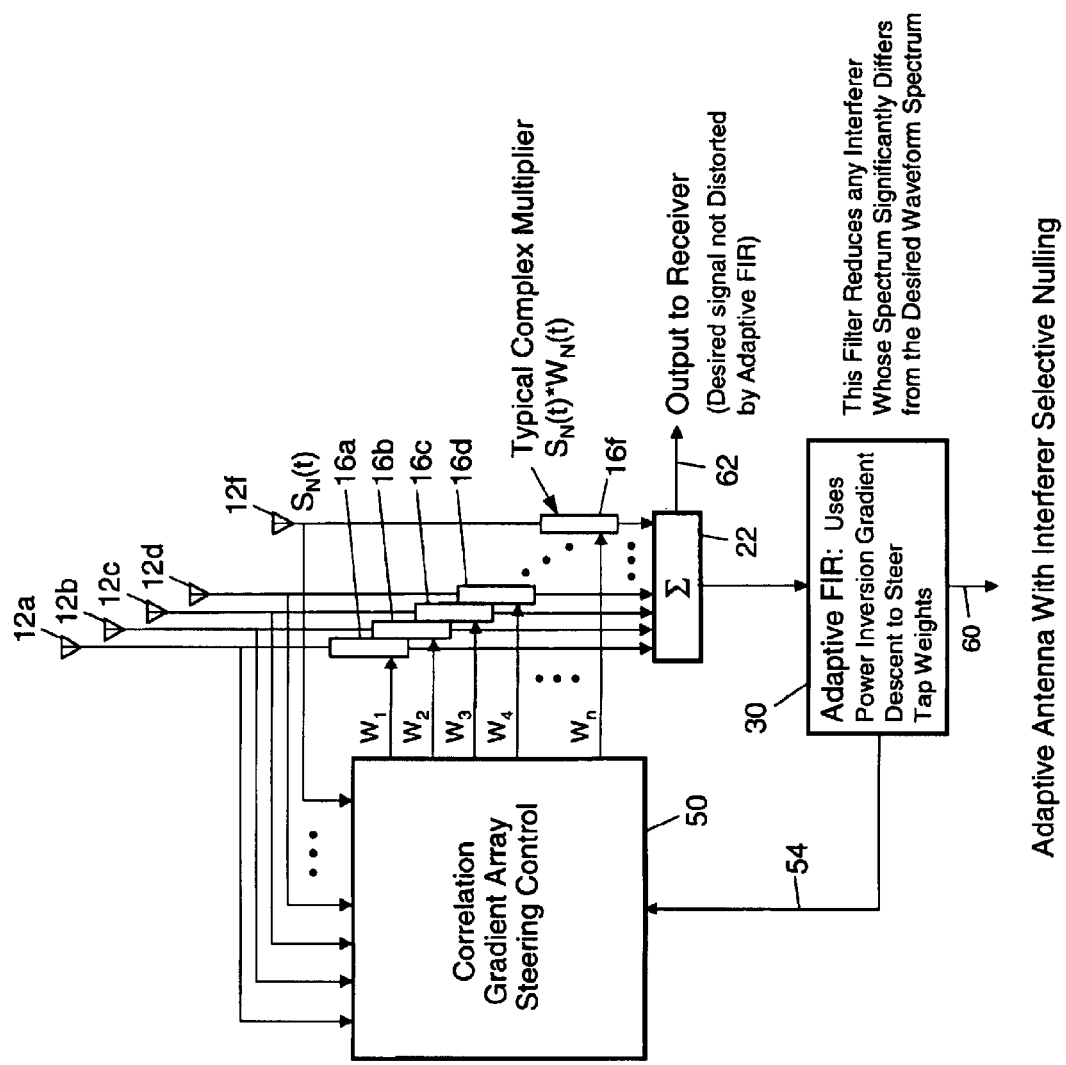
FIG. 3 is a simplified block diagram of the embodiment shown in FIG. 2.

The array output 60 shown in FIGS. 1 and 2 can be taken from two points a and b of switch 37 in filter function 30, and is the choice of the user. Switch 37 enables the user to connect point c with either point a or point b. Since the preferred embodiment may be used by systems having spread spectrum protection, then the output taken from point b will still contain the narrowband jammers, but not the broadband jammers. Since the signal has spread spectrum gain, the narrowband jammers can be reduced by normal spread spectrum processing. If the narrowband jammers are very strong, one may elect to switch to point a, and use the narrowband suppressed filter output as input to the demodulation process. Here, the notching may have some distorting effect on the demodulated signal. Output 62 shown in FIG. 3 is the equivalent of using the output from point b of switch 37.

The filtered signal from function 30 is transmitted on path 54 to weight processor function 50 which also receives each of the phase split antenna signals from phase splitters 18a–18f on inputs 52a1–52f2 as shown. In a well known manner, processor function 50 computes complex weights appearing on outputs 56 and used to steer antenna array 10. Those skilled in the art will understand the computations based on the teaching in U.S. Pat. No. 4,286,268.

While ordinary skill could be exercised to incorporate a broadband nulling scheme to best suit the particular situation at hand, it can be appreciated by skilled practitioners that some form of nulling control is preferred which reacts fastest to the largest eigenvalues (jammer powers), and which due to the dynamics of the jamming geometry, will therefore tend to ignore any small residual narrowband jammer power left in the computation of the jammer covariance. With the narrowband jammer powers thus reduced, the preferred method of control is by iterative gradient steered power inversion, one method of implementation being steepest descent. Two continuously iterating algorithms can be used to control the weights in the embodiment. The first can be written as:

$$\underline{W}(t) = -\lambda \int_{-\phi}^{t} \underline{G}(x)dx$$

where the value of $\lambda$ can be fixed at a constant value to achieve a slow stable convergence, as is well known. The second algorithm using true steepest descent can control the weights so as to achieve rapid stable convergence is described in detail in U.S. No. 4,286,268, and can be written in iterative form as:

$$W(t_i)=W(t_{i-1})-\lambda G(t_{i-1})$$

where $\lambda$ will be computed iteratively (described in the cited patent) so as to cause the output power metric to be minimized after each successive step.

Conversely, it would not be advantageous to use any of the many types of batch covariance processing techniques for the antenna array weight computation, which are used to successfully combat rapid dynamics and non-stationary jammers, since that would tend to defeat the attempt to reduce the influence of the narrowband jammers in the weight computation process under dynamically varying jammer geometry.

The control loop of the preferred embodiment of the present invention will now be described in greater detail. The input wavefront, containing both the desired wavefront and the jamming wavefronts is received by the half wavelength spaced linear array 10 of n elements (n=6 in the example shown). The input antenna signals are centered about frequency Fo, and each antenna output is preamplified and filtered by circuits 14a–14f to a bandwidth equal to the desired spread signal. Each channel output is then passed through a phase splitter (e.g., 18a), which produces an in phase (i) and a quadrature (q) component. For the $i^{th}$ channel, we denote the received in phase and quadrature components by XiI, and XiQ; each component is then multiplied by a steering weight, i.e., WiI or WiQ; mathematically, one then forms the scalar dot product $S_c(t)$ of the preamplified signal vector X(t) and the computed steering weight vector W(t), ($S_c(t)=X^TW$.). This appears at the output of the summer function 22. The weights are controlled by the gradient of the output power to steer the output power to a minimum. The normal steering gradient G(t) can be defined as:

$$G(t)=\text{Average}[X'(t) \cdot S_c(t)],$$

When employing this invention the gradient is computed as:

$$G(t)=\text{Average}[X'(t) \cdot \text{Filtered}[S_c(t)]],$$

where Filtered implies either a whitening process or a tone excision process, and the complex conjugate value of the input vector (X') is used, and is seen to contain the cross correlation of the jammer signals in X'(t) with the jammer signals in the filtered version of $S_c(t)$. Clearly, when narrowband tone jammer energy is removed from $S_c(t)$ by adaptive filtering or excising in an FFT in filter 30, there will be no or very small correlation terms of the narrowband jammers, and thus the weights will not be steered or influenced by them. Since the desired signal is a PN spread signal, then the output of the array may be taken either from $S_c(t)$ directly (point b), in which case the tone jammer energy is removed by PN despreading, or from the tone filtered version used to form the gradient as defined above (point a), in which case the PN processing gain is added to the tone reduction, but at the expense of slightly distorting the original PN spectrum. As shown in FIGS. 1 and 2, either case may be selected as the output.

Those skilled in the art will recognize that only the preferred embodiments of the invention have been described in this specification. These embodiments may be modified and altered without departing from the true spirit and scope of the invention as defined in the accompanying claims. For example, the various functions described in connection with the Figures (e.g., functions 18, 20, 22, 30 and 50) may be implemented by software or hardware or a combination of software and hardware. The processor used to implement filter function 30 may be combined with the processor used to implement function 50. The processors may take the form of a microprocessor, a microcontroller, a digital signal processor or a logic circuit capable of logical and arithmetic operations.

What is claimed is:

1. In a steerable antenna comprising a plurality of antenna elements receiving a first type signal and an interfering second type signal different from the first type signal, the antenna elements generating corresponding antenna signals, the antenna signals being combined with weighting signals to form at least one combined signal, apparatus for nulling the interfering second type signals comprising:

a filter arranged to filter the second type signal from the combined signal to generate a filtered signal, wherein the filter reduces said frequencies exceeding the average spectral density of the first type signal to an amplitude less than the average amplitude of the first type signals to generate the filtered signal; and a weight processor responsive to the filtered signal and the antenna signals to generate said weighting signals, whereby interference from the second type signal is reduced.

2. Apparatus, as claimed in claim 1, wherein the filter comprises a processor.

3. Apparatus, as claimed in claim 1, wherein the first type signal comprises a first band width and wherein the second type signal comprises a second band width different from the first band width.

4. Apparatus, as claimed in claim 3, wherein the second band width is narrower than the first band width.

5. Apparatus, as claimed in claim 1, wherein said filter converts said combined signal to the frequency domain, filters the second type signal from the combined signal in the frequency domain to generate a corrected signal and converts the corrected signal to the time domain.

6. Apparatus, as claimed in claim 5, wherein said filter down converts the combined signal to base band before converting the combined signal to the frequency domain and up converts the time domain corrected signal to the radio frequency range.

7. Apparatus, as claimed in claim 1, wherein the filter uses power minimization to seek frequencies exceeding the average spectral density of the first type signal.

8. Apparatus, as claimed in claim 7, wherein the filter down converts the combined signal to base band before using power minimization and up converts the filtered signal to radio frequency range.

9. Apparatus, as claimed in claim 1, wherein the weight processor comprises a correlation gradient array steering control.

10. Apparatus, as claimed in claim 1, wherein the at least one combined signal comprises a plurality of combined signals, each of the combined signals corresponding to one of said antenna elements, and wherein said apparatus further comprises a summer arranged to sum the plurality of combined signals to form the one combined signal.

11. In a steerable antenna comprising a plurality of antenna elements receiving a first type signal and an interfering second type signal different from the first type signal, the antenna elements generating corresponding antenna signals, the antenna signals being combined with weighting signals to form at least one combined signal, a method of nulling the interfering second type signals comprising:

filtering the second type signal from the combined signal to generate a filtered signal, wherein said filtering comprises converting said combined signal to a frequency domain, filtering the second type signal from the combined signal in the frequency domain to generate a corrected signal and converting the corrected signal to a time domain to generate the filtered signal; and generating said weighting signals in response to the filtered signal and the antenna signals, whereby interference from the second type signal is reduced.

12. A method, as claimed in claim 11, wherein the filtering comprises digital processing.

13. A method, as claimed in claim 11, wherein said filtering comprises converting said combined signal to a frequency domain by performing a fast Fourier transform on the combined signal, filtering the second type signal from the combined signal in the frequency domain to generate a corrected signal and converting the corrected signal to a time domain by performing an inverse fast Fourier transform on the corrected signal to generate the filtered signal.

14. A method, as claimed in claim 11, wherein said filtering further comprises down converting the combined signal to base band before converting the combined signal to the frequency domain and up converting the time domain corrected signal to the radio frequency range.

15. A method, as claimed in claim 11, wherein the filtering comprises using power minimization to seek frequencies exceeding the average spectral density of the first type signal in the frequency domain.

16. A method, as claimed in claim 11, wherein the filtering comprises reducing said frequencies exceeding the average spectral density of the first type signal to an amplitude less than the average amplitude of first type signals to generate the filtered signal.

17. A method, as claimed in claim 16, wherein the filtering comprises down convening the combined signal to base band before using power minimization and up converting the filtered signal to radio frequency range.

18. A method, as claimed in claim 11, wherein the generating comprises correlation gradient array steering control.

19. A method, as claimed in claim 11, wherein the at least one combined signal comprises a plurality of combined signals, each of the combined signals corresponding to one of said antenna elements, and wherein said method further comprises summing the plurality of combined signals to form the one combined signal.

* * * * *